Nov. 21, 1967   R. R. COUNCILMAN   3,353,290
SLIDE SELECT AND POSITIONING DEVICE
Filed Oct. 24, 1965
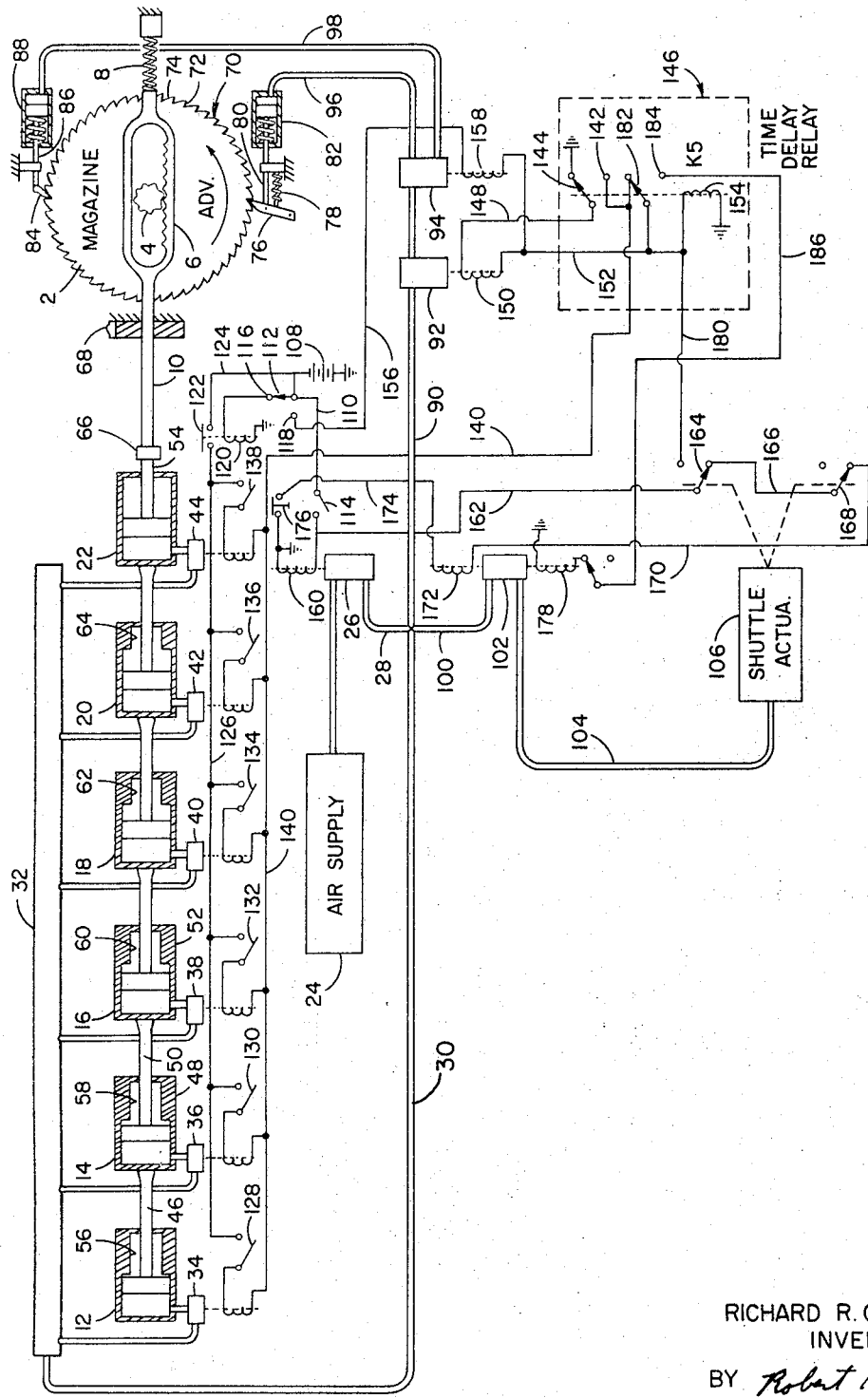
RICHARD R. COUNCILMAN
INVENTOR
BY Robert M. Sperry
ATTORNEY

United States Patent Office 3,353,290
Patented Nov. 21, 1967

3,353,290
SLIDE SELECT AND POSITIONING DEVICE
Richard R. Councilman, Garland, Tex., assignor to Ling-Temco-Vought, Inc., Dallas, Tex., a corporation of Delaware
Filed Oct. 24, 1965, Ser. No. 504,959
4 Claims. (Cl. 40—79)

ABSTRACT OF THE DISCLOSURE

This invention relates to electro-pneumatic means for positioning the magazine of an automatic slide projector to permit either sequential or random selection of slides. The device includes a plurality of serially connected pneumatic actuators each having a respective stroke length to permit positioning of said magazine in a binary coded decimal relationship.

---

This invention relates to slide projectors and is particularly directed to novel mechanism for selecting slides from a slide magazine for projection by the projector.

Slide projectors are well known and projectors equipped with magazines containing libraries of slides are equally common. However, most of the prior art magazine slide projectors are designed to present the slides from the magazine sequentially only and relatively few have been provided for permitting random selection of the slides. Some of the prior art magazine slide projectors have permitted manual positioning of the magazine to permit random selection of the slides. However, such techniques are slow and laborious.

Recently, slide projectors have been developed which are provided with slides having an opaque coating and which include means for scribing the coating to permit projection of the scribed data. Such a device is shown in the patent to Donald M. Fenske et al., Pat. No. 2,859,659, issued Nov. 11, 1958. Scribing projectors of this type may, for example, be driven by computers which are supplied with data from satellite tracking stations, and the like, and serve to provide a visual display of such data. As each slide is completed, the projector returns the scribed slide to the magazine and supplies a clean slide on which additional data may be scribed. The scribed slides provide a permanent record of the data and may be projected subsequently, as desired. Thus, for example, such displays may be of considerable value in post-mission reviews, and the like. However, for such purposes, it is highly advantageous to be able to select desired slides from the magazine in a random manner. Moreover, it is desirable that such random selection should be rapid, accurate and reliable. Numerous devices have been proposed for permitting such selection of slides. However, none of the prior art devices have ben entirely satisfactory. Many of the prior art devices have been complex and bulky and have required considerable maintenance. Furthermore, many of the previous devices have been slow, inaccurate and unreliable in operation.

These disadvantages of the prior art are overcome with the present invention and novel mechanism is provided which is selectably operable to permit either sequential or random selection of slides and which may be switched, at any desired time, from sequential to random mode of operation or vice versa. Furthermore, the apparatus of the present invention is simple and uncomplicated, yet permits rapid, accurate, and reliable operation. The apparatus of the present invention is particularly advantageous for projectors employing rotary magazines since it permits both forward and reverse rotation of the magazine which permits positioning of a selected slide in a minimum of time. Moreover, the device of the present invention is capable of operation by remote control or by commands from a computer or programmer.

The advantages of the present invention are preferably attained by providing novel electro-pneumatic control means for selecting and positioning slides for magazine slide projectors wherein the slide magazine is positionable through the action of a plurality of serially connected pneumatic actuators which are each controlled by a respective parallel connected electrical relay and the strokes of the actuators are of such respective lengths as to permit actuation of the actuators in a binary coded decimal relationship. Indexing means are provided which cooperate with serrations formed on the magazine to assure accurate registration of the magazine in a selected position and means are provided for deactivating the indexing means, during random mode operation, to permit either forward or rearward movement of the magazine to permit rapid attainment of a selected position.

Accordingly, it is an object of the present invention to provide improved means for selecting and positioning the slides of a magazine slide projector.

Another object of the present invention is to provide improved means for selecting and positioning the slides of a magazine slide projector which is selectably operable to permit either sequential or random selection of slides and which can be switched at any time from sequential to random mode operation or vice versa.

An additional object of the present invention is to provide improved means for selecting and positioning slides of a magazine slide projector having a rotary magazine, said means being operable to permit either forward or reverse rotation of said magazine to permit rapid attainment of a selected position.

A specific object of the present invention is to provide improved means for selecting and positioning slides of a magazine slide projector, said means comprising a plurality of serially connected pneumatic actuators operable to position said magazine and having strokes of such respective lengths as to permit actuation of said actuators in a binary coded decimal relationship, a plurality of parallel connected electrical relays each operable to control actuation of a respective one of said actuators, indexing means cooperating with said magazine to retain said magazine in a selected position, and means for deactivating said indexing means to permit either forward or rearward movement of said magazine to a selected position.

These and other objects and features of the present invention will be apparent from the following detailed description taken with reference to the figure of the accompanying drawing.

In the drawing:

The figure is a diagrammatic representation of a slide selecting and positioning mechanism embodying the present invention.

In that form of the present invention chosen for purposes of illustration in the drawing, the figure shows a slide selecting and positioning mechanism, embodying the present invention, for use with a slide projector having a rotary slide magazine, indicated at 2, which is mounted, in any suitable manner, for rotation by pinion 4. Pinion 4 is driven by rack 6 which is biased by resilient means, such as compression spring 8, to a "zero" position. As shown in the figure, the "zero" position of rack 6 is toward the left. To move the magazine 2 to a selected position, rack 6 is driven against the action of spring 8 by rod 10 which is driven by a plurality of serially connected pneumatic actuators 12, 14, 16, 18, 20, and 22. Each of the actuators 12, 14, 16, 18, 20, and 22 is energized by air supplied from a suitable source 24 through main control valve 26, conduits 28 and 30 and manifold 32 and each piston is controlled by a respective one of the relay-actuated valves 34, 36, 38, 40, 42, and 44. It will be seen that each of the actuators 12, 14, 16, 18, 20, and 22 comprises a cylinder and piston and that the piston of each actuator is connected to the cylinder of the adjacent actuator. Thus, piston 46 of actuator 12 is connected to the cylinder 48 of actuator 14 and the piston 50 of actuator 14 is connected to the cylinder 52 of actuator 16, and so forth, with the piston 54 of the final actuator 22 being connected to rod 10. Consequently, the movement applied to rod 10 is equal to the sum of the stroke lengths of the actuators 12, 14, 16, 18, 20, and 22 which are energized. Moreover, each of the actuators 12, 14, 16, 18, 20, and 22 are provided with means, such as stops 56, 58, 60, 62, and 64, which serve to limit the stroke of the respective actuators in a binary coded decimal relationship. Thus, actuator 12 has a stroke which is one unit of length, actuator 14 has a stroke which is twice the length of the stroke of actuator 12, actuator 16 has a stroke length four times that of actuator 12, actuator 18 has a stroke length eight times that of actuator 12, actuator 20 has a stroke length ten times that of actuator 12, and actuator 22 has a stroke length twenty times that of actuator 12. With this arrangement, it is possible to cause rod 10 to move a distance equal to any whole number multiple of the unit length by energizing an appropriate combination of the actuators 12, 14, 16, 18, 20, and 22. For example, rod 10 may be moved three length units by energizing actuators 12 and 14. Similarly, rod 10 may be moved fifteen length units by energizing actuators 12, 16, and 20. Obviously, the unit length should be such as to cause rod 10 to move rack 6 a sufficient distance to cause pinion 4 to move magazine 2 from one slide position to the next adjacent slide position. It will be apparent that the number of actuators provided may be varied to accommodate magazines of any desired slide capacity. Moreover, where the movement attainable by energization of all of the actuators simultaneously exceeds the capacity of the magazine, means, such as stop 66 and wall 68 may be provided to limit the movement of rod 10. Thus, as described above, actuators 12, 14, 16, 18, 20, and 22 permit movement of rod 10 to forty-six positions, it being understood that the "zero" position of rod 10, when all of the actuators 12, 14, 16, 18, 20, and 22 are deenergized, corresponds to the position in which the first slide of magazine 2 is presented to the projector. Consequently, if the magazine has a capacity of forty slides, it is necessary to provide for movement of rod 10 through thirty-nine unit lengths and stop 66 should be positioned to limit the movement of rod 10 to this length. In this way, each possible combination of the actuators 12, 14, 16, 18, 20, and 22 corresponds to a respective one of the slide positions of magazine 2 and energization of actuator combinations exceeding the capacity of the magazine 2 will be prevented from causing over-travel of the magazine 2 which could cause confusion. Thus, in the example described above, simultaneous energization of all of the actuators 12, 14, 16, 18, 20, and 22 would tend to cause rod 10 to move forty-five unit lengths. However, this would cause stop 66 to engage wall 68 and the movement of rod 10 and magazine 2 would be limited to the fortieth slide position.

To permit sequential movement of the magazine 2 and to permit accurate registration of the magazine 2 in a selected position, the magazine 2 is preferably formed with a plurality of ratchet-like serrations, as indicated at 70, each having a straight side 72 and an inclined side 74 and each corresponding to a respective slide position. A detent 76 is biased by resilient means, such as spring 78, to engage the serrations 70 to urge the magazine 2 into accurate registration at the selected position. In addition, the detent 76 is connected to the piston 80 of a pneumatic actuator 82 which is actuable to disengage detent 76 from the serrations 70 to permit rapid movement of the magazine 2 in either the forward or reverse direction. In addition, a pawl 84 is provided located adjacent the serrations 70. Pawl 84 is carried by the piston 86 of a pneumatic actuator 88 and is normally maintained out of engagement with the serrations 70 but is operable, upon energization of actuator 88 to engage the serrations 70 and to advance the magazine 2 from one slide position to the next adjacent slide position in a sequential or step-wise manner. Air for energizing the detent retracting actuator 82 and the step-wise advance actuator 88 is supplied from source 24 through main control valve 26, conduits 28 and 90, magazine advance valve 92 and selector valve 94. The valves 92 and 94 are relay actuated and magazine advance valve 92 acts merely to pass or block the flow of air, while selector valve 94 is a two-position valve which, in one position, passes air through conduit 96 to the detent retracting actuator 82 and, in the other position, passes air through conduit 98 to the step-wise advance actuator 88.

The slide changing mechanism of the projector for withdrawing slides from the magazine for projection and for returning the slides to the magazine may be of any conventional type. Preferably, however, the slide changing mechanism is synchronized with the slide positioning mechanism, described above, so that the slide changing mechanism will not be operated in a manner which will interfere with the operation of the slide positioning mechanism. Obviously, the details of the synchronizing means will depend, to some extent, upon the specific type of slide changing mechanism employed by the projector. However, in all automatic slide projectors, the slide changing mechanism will necessarily include a shuttle, or the like, which is movable between a first position, for removing slides from or returning slides to the magazine, and a second position, wherein the slides are in position for projection. In addition, such slide changing mechanisms must also necessarily include some form of shuttle actuator. To synchronize the operation of the slide changing mechanism with the operation of the slide positioning mechanism, the apparatus of the present invention includes a pair of limit switches, located adjacent opposite ends of the travel of the shuttle of the slide changing mechanism and operable by the shuttle as it approaches the appropriate ends of its travel, and means for energizing and deenergizing the shuttle actuator at appropriate times. Aside from the requirements that the slide changing mechanism must include a movable shuttle and a shuttle actuator, as described above, the construction and operation of the slide changing mechanism may be of any desired type and forms no part of the present invention. However, for purposes of describing the synchronizing mechanism of the present invention, it will be assumed that the projector is equipped with a pneumatically actuated slide changing mechanism, such as that disclosed and claimed in the copending application of Richard R. Councilman et al., Ser. No. 387,900, filed Aug. 6, 1964, now Patent No. 3,260,155, issued July 12, 1966.

As discussed above, it is assumed that the slide projector is equipped with a pneumatically actuated slide changing mechanism. Accordingly, air for operating the slide changing mechanism is supplied from source 24 through main control valve 26, conduits 28 and 100, slide change control valve 102, and conduit 104, to the shuttle actuator, indicated at 106.

Electrically, the mechanism of the present invention receives electric current from any suitable source, such as battery 108, and this current is supplied by lead 110 to a mode control switch 112 and a main control switch 114. The mode control switch 112 determines whether the slide positioning mechanism is to operate in the random or sequential mode and is movable to engage either random mode contact 116 or sequential mode contact 118. Placing mode control switch 112 in engagement with random mode contact 116 energizes solenoid 120 which closes switch 122, allowing electrical current to flow from source 108 through lead 124 and switch 122 to lead 126. As shown, a plurality of switches 128, 130, 132, 134, 136, and 138 are connected in parallel with each other between leads 126 and 140 and each of these switches is operable to permit energization of a respective one of the relay-actuated valves 34, 36, 38, 40, 42, and 44. Lead 140 is connected to contact 142 of switch element 144 of a time delay relay, indicated at 146. However, it will be noted that switch element 144 does not engage contact 142 until time delay relay 146 is actuated. Thus, closure of one or more of the switches 128, 130, 132, 134, 136, and 138 serves to arm the respective relay-actuated valves 34, 36, 38, 40, 42, and 44, but actual operation of the valves 34, 36, 38, 40, 42, and 44 will not occur until time delay relay 146 is actuated. At that time switch element 144 is moved to engage contact 142 and connects lead 140 to ground through lead 148, relay 150 of magazine advance valve 92, lead 152, and the winding 154 of time delay relay 146.

Placing mode switch 112 in engagement with the sequential mode contact 118 deenergizes relay 120, opening switch 122 to remove current from lead 126 and, thereby, preventing operation of the pneumatic actuators 12, 14, 16, 18, 20, and 22. At the same time, an electrical circuit is completed, from source 108 through mode switch 112, sequential mode contact 118, lead 156, relay 158 of selector valve 94, lead 148, and switch element 144 of time delay relay 146 to ground. As indicated above, selector valve 94 is a two-position valve. For random mode operation, relay 158 is deenergized, and selector valve 94 serves to permit passage of air to actuator 82 to retract detent 76 to facilitate movement of the magazine 2. In contrast, for sequential mode operation, current through relay 158 causes selector valve 94 to permit passage of air to step-wise advance actuator 88 and to cut off air from actuator 82. However, it should be noted that no air can be passed by selector valve 94, in either mode, until the magazine advance valve 92 has been actuated.

Closure of the main control switch 114 completes an electrical circuit from source 108 through lead 110 and switch 114 to energize relay 160 which opens main control valve 26. This allows pressurized air from source 24 to be supplied through the various conduits to manifold 32, magazine advance valve 92, and slide change control valve 102. At the same time, closure of main control switch 114 supplies current to the circuit including lead 162, a first shuttle-actuated limit switch 164, lead 166, a second shuttle-actuated limit switch 168, lead 170, relay 172 of slide change control valve 102, lead 174, and slide change push button 176. Push button 176 is normally biased to its open circuit position, but is operable, upon closure thereof, to initiate the slide changing and slide positioning operations.

In operation, main control switch 114 is first closed to perform the functions described in the preceding paragraph, and mode switch 112 is positioned to select the desired mode of operation. Initially, it will be assumed that sequential slide selection is desired. Accordingly, mode switch 112 is positioned to engage sequential mode contact 118. This energizes relay 158 and positions selector valve 94 to pass air to sequential actuator 88. To change slides, slide change push button 176 is closed, momentarily, to complete the circuit which energizes relay 172 of slide change control valve 102. Valve 102 is a bistable valve which is opened by relay 172 and remains until closed by a second relay 178. When opened, by relay 172, valve 102 passes air to shuttle actuator 106 to cause the shuttle of the slide changing mechanism to move from its slide projecting position to its magazine engaging position. As the shuttle leaves the slide projecting position, it opens limit switch 168 to deenergize relay 172. Upon reaching the magazine engaging position, the shuttle moves limit switch 164 to deenergize lead 166 and apply current to lead 180. This current energizes relay 150 to open magazine control valve 92 and, also, energizes relay 154 of time delay relay 146 to initiate the time delay. When magazine control valve 92 is opened, it passes air through selector valve 94 and conduit 98 to operate sequential actuator 88, causing pawl 84 to advance magazine 2 to the next slide position. As the magazine 2 advances, the inclined surfaces 74 of the serrations 70 force detent 76 against the action of spring 78. However, when the magazine 2 reaches the next slide position, spring 78 urges detent 76 to engage the straight side 72 of serration 70 to assure proper registry of the magazine 2 in the new position and to prevent rearward movement of the magazine 2.

When the time delay of time delay relay 146 has elapsed, relay 154 is actuated to re-position switch members 144 and 182. In sequential mode operation, movement of switch member 144 to engage contact 142 acts to deenergize relay 150 and, hence, to close magazine control valve 92, since no current is applied through lead 140. This cuts off the air from sequential actuator 88 to retract pawl 84 out of engagement with the serrations 70. At the same time, switch member 182 is moved to engage contact 184 which, then, passes current through lead 186 to energize relay 178 of slide change control valve 102. Relay 178 closes slide change control valve 102 which cuts off the air from the shuttle actuator 106, causing the shuttle to move from the magazine engaging position to the slide projecting position. As the shuttle leaves the magazine engaging position, limit switch 164 is moved to disconnect lead 180, thereby deenergizing time delay relay 146, and engages the contact of lead 166. When the shuttle reaches the slide projecting position, limit switch 168 is moved to re-arm the circuit through relay 172 of slide change control valve 102 to slide change push button 176. Thus, the apparatus is readied to repeat the foregoing operations, each time slide change push button 176 is pressed, to advance magazine 2 in a step-wise or sequential manner.

For random mode operation, main control switch 114 is closed to complete the circuits therethrough, as described above, and mode switch 112 is positioned to engage random mode contact 116. This energizes relay 120 which closes switch 122 to apply current to lead 126. It is now possible to select any desired slide in magazine 2 for projection. To do this, the binary coded decimal notation, corresponding to the number of the desired slide, is set up by closure of the appropriate combination of the switches 128, 130, 132, 134, 136, and 138. As described above, closure of the switches 128, 130, 132, 134, 136, and 138 arms the respective relay-actuated valves 34, 36, 38, 40, 42, and 44. However, actual operation of the valves 34, 36, 38, 40, 42, and 44 does not occur at this time. It should be noted that, for random mode operation, relay 158 is not energized and, therefore, selector valve 94 is positioned to pass air to detent retracting actuator 82. When slide change push button 176 is pressed, relay 172 is energized to open slide change control valve 102 to pass air to shuttle actuator 106, causing the shuttle of the slide changing mechanism to move to the magazine engaging position, as described before. Movement of the shuttle opens limit switch 168 to deenergize relay 172 and moves limit switch 164 to apply current to lead 180. This energizes relay 150 to open magazine advance valve 92 which passes air through selector valve 94 and conduit 96 to operate actuator 82. As described previously, actuator 82 serves to disengage detent 76 from the serrations 70 of magazine 2 to permit magazine 2 to be freely movable in either the forward or reverse direction. When relay 154 of time delay relay 146 is operated, switch member 144 is moved to engage contact 142 and completes the circuit for switches 128, 130, 132, 134, 136, and 138 through relay 150 of magazine advance valve 92 and relay 154 to ground. Consequently, the selected combination of the relay actuated valves 34, 36, 38, 40, 42, and 44 will now be opened to allow passage of air from manifold 32 to the appropriate one or more of the pneumatic actuators 12, 14, 16, 18, 20, and 22 to drive rod 10, rack 6, and pinion 4 to rotate magazine 2 to the selected position. Since detent 76 has been disengaged, magazine 2 may be moved either forward or backward to reach the selected position in a minimum time. Operation of relay 154 of time delay relay 146 also moves switch member 182 to engage contact 184 to energize relay 178 of slide change control valve 102 which serves to return the shuttle of the slide changing mechanism to the slide projecting position and rearms the apparatus for the next slide changing operation.

As described above, operation can be changed, at any time, from random mode operation to sequential mode operation, or vice versa, by appropriately positioning mode switch 112. Moreover, although the device has been described in connection with a pneumatically actuated slide changing mechanism, it will be apparent that, with obvious substitutions, the device of the present invention would be equally useful with electrically actuated slide changing mechanisms. In addition, the device of the present invention could, obviously, be modified to employ linear, rather than rotary, slide magazines. Furthermore, although the device of the present invention has been described for manual control, it will be apparent that the same control operations may readily be performed by remote control or by commands from a suitable computer or programmer. In addition, numerous other variations and modifications may, obviously, be made without departing from the present invention. Accordingly, it should be clearly understood that the form of the present invention described above and shown in the figure of the accompanying drawing is illustrative only and is not intended to limit the scope of the invention.

What is claimed is:

1. Means for selecting and positioning slides of a slide projector having a magazine, said means comprising:
   means urging said magazine to a predetermined position;
   a plurality of serially connected pneumatic actuators operable to position said means, each of said actuators having a respective stroke length;
   a plurality of parallel connected electrical relays to permit actuation of said actuators in a binary coded decimal relationship, each of said relays operable to control actuation of a respective one of said actuators;
   indexing means cooperating with said magazine to retain said magazine in a selected position; and
   means for deactivating said indexing means to permit said magazine to be freely movable in either direction to a selected position.

2. The apparatus of claim 1, further comprising:
   sequential advance means for advancing said magazine in a stepwise manner; and
   means operable in a first condition to deenergize said relays and operable in a second condition to prevent operation of said sequential advance means.

3. Apparatus for selecting and positioning slides of a slide projector having a magazine and shuttle means movable between a magazine engaging position and a slide projecting position, said apparatus comprising:
   means urging said magazine to a predetermined position;
   a plurality of serially connected actuators operable to position said means, each of said actuators having a respective stroke length;
   a plurality of actuator control means to permit actuation of said actuators in a binary coded decimal relationship, each of said relays operable to control actuation of a respective one of said actuators;
   indexing means cooperating with said magazine to retain said magazines in a selected position;
   means for deactivating said indexing means to permit said magazine to be freely movable in either direction to a selected position;
   sequential advance means for advancing said magazine in a stepwise manner;
   selector means operable in a first condition to deenergize said actuator control means and operable in a second condition to prevent operation of said sequential advance means; and
   means responsive to movement of said shuttle to said magazine engaging position for energizing said actuator control means, when said selector means is in said second condition, and for actuating said sequential advance means, when said selector means is in said first condition.

4. The apparatus of claim 3, further comprising:
   means responsive to movement of said shuttle means from said magazine engaging position to said slide projecting position for preparing said apparatus for a subsequent magazine positioning operation.

References Cited

UNITED STATES PATENTS 3,299,554   1/1967   Leaver _____ 40—79

EUGENE R. CAPOZIO, *Primary Examiner.*

W. GRIEB, *Assistant Examiner.*